March 10, 1925.
G. H. DIDINGER
DRY FEED MACHINE
Filed Feb. 17, 1922
1,529,173
5 Sheets-Sheet 5
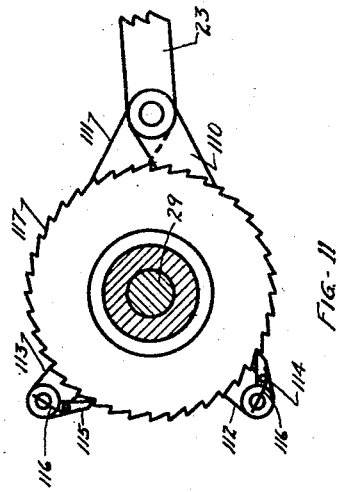
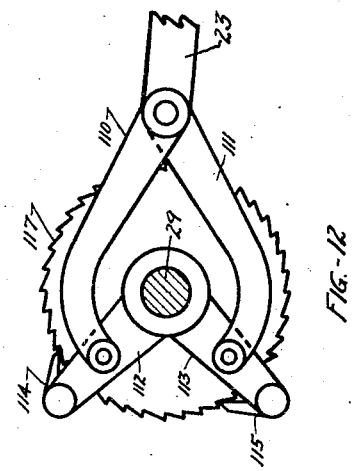
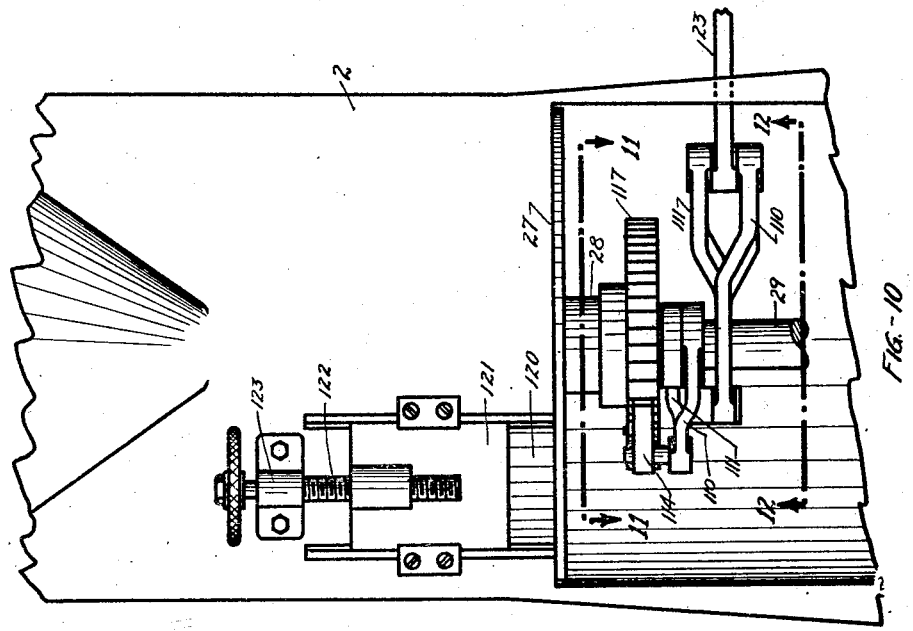
INVENTOR
George H. Didinger
BY
Cyrus W. Anderson
ATTORNEY Patented Mar. 10, 1925.

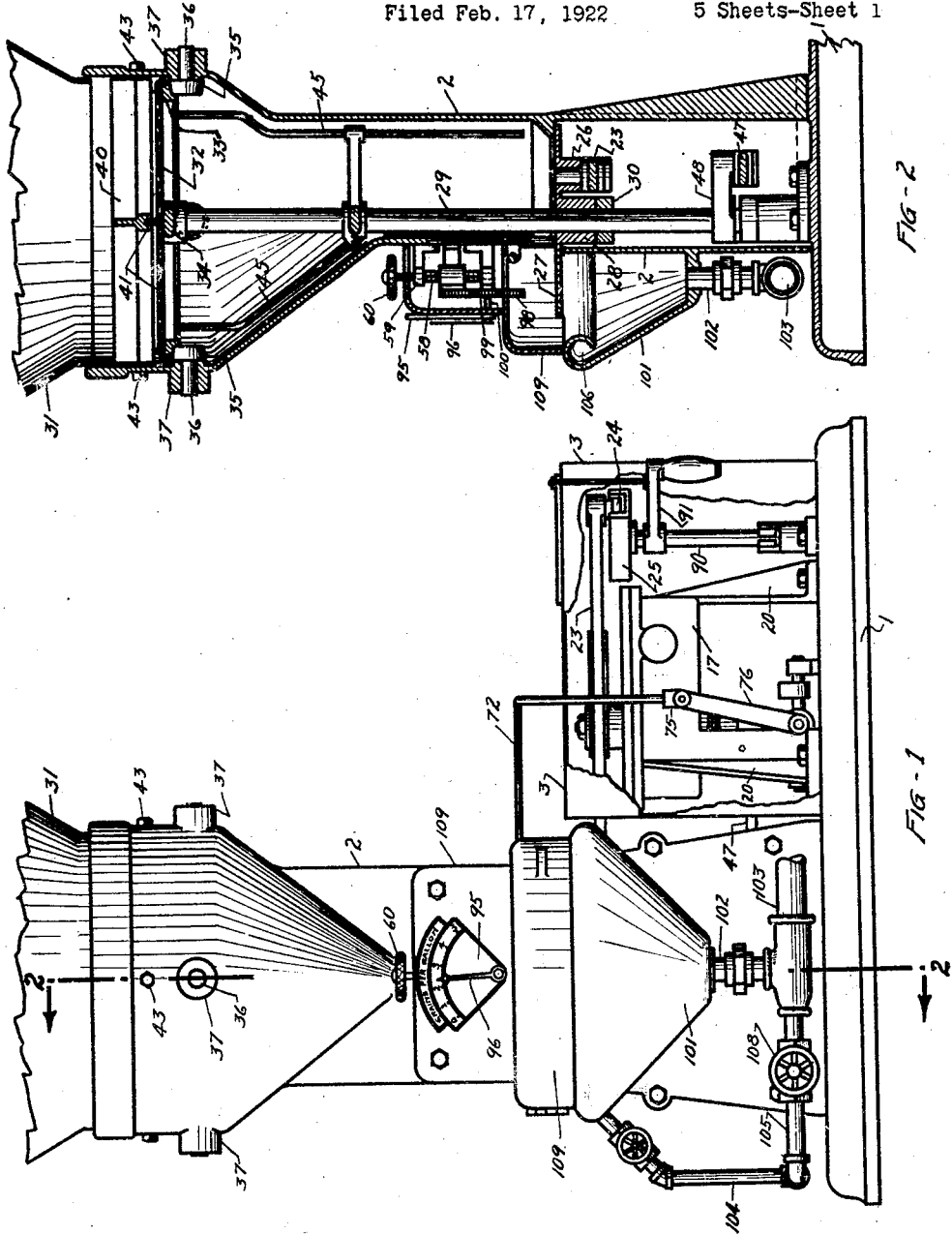

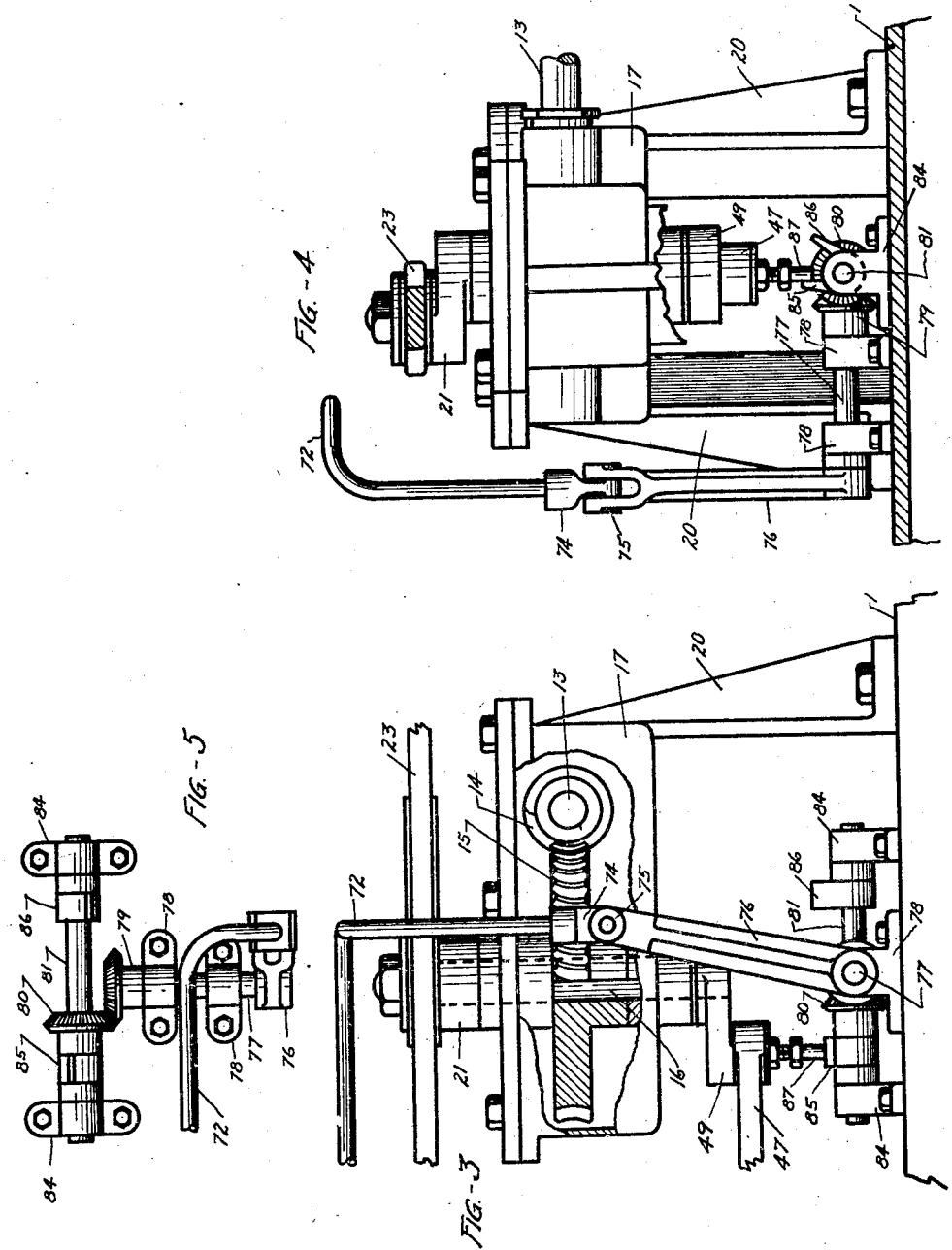

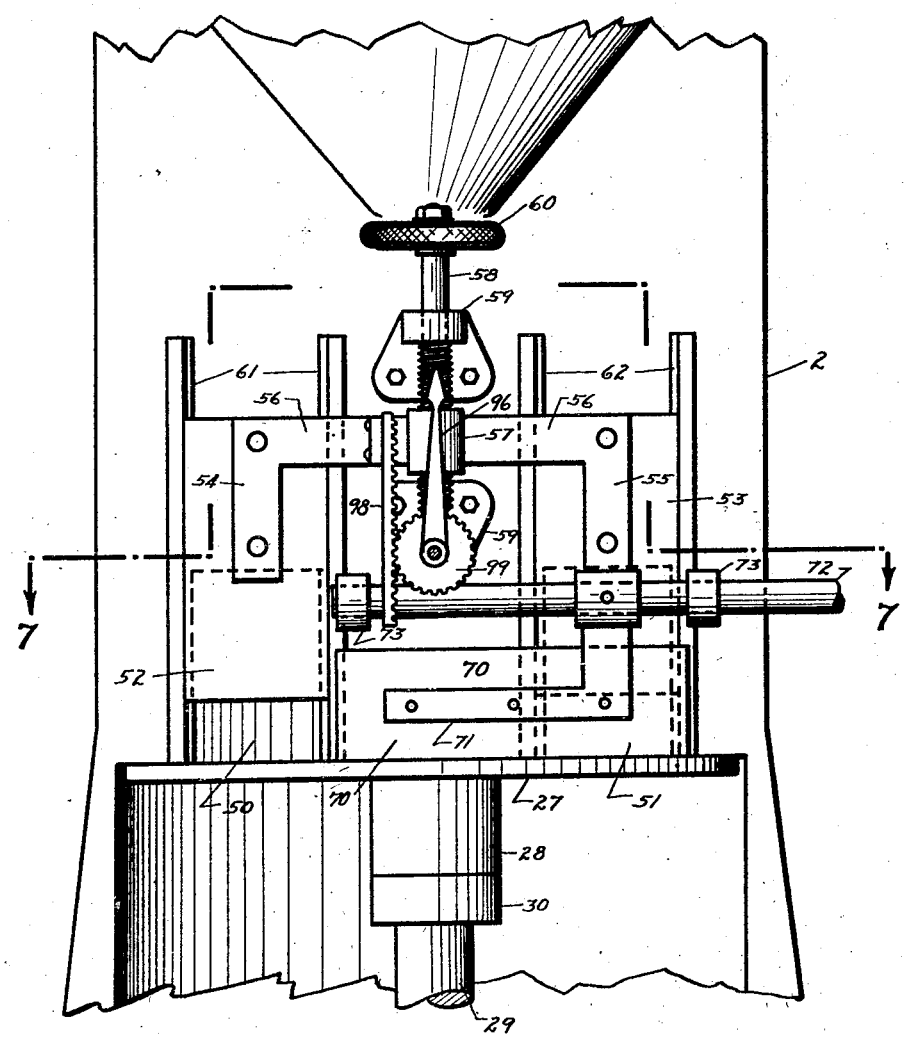

1,529,173

UNITED STATES PATENT OFFICE.

GEORGE H. DIDINGER, OF PHILADELPHIA, PENNSYLVANIA.

DRY-FEED MACHINE.

Application filed February 17, 1922. Serial No. 537,342.

*To all whom it may concern:*

Be it known that I, GEORGE H. DIDINGER, a citizen of the United States, and a resident of Philadelphia, in the county of Philadelphia and State of Pennsylvania, have invented an Improvement in Dry-Feed Machines, of which the following is a specification.

My invention relates to machines which are adapted for feeding powder or granular material in dry form for use in the treatment of water, sewage and the like, and for other analogous purposes.

It is desirable that such machines shall supply the material being fed thereby uniformly in the quantites and the proportions desired with respect to the quantity of water, sewage, or other material which is being treated, and it is also desirable that such machines shall supply such material in a finely powdered or granular state and not in lumps or relatively large portions or pieces.

The principal object, therefore, of my invention is to provide a machine having the capacity of supplying material in the form of a dry powder, in the condition desired, uniformly and in the proportions required with respect to the quantity of water, sewage, or other material to which the powder is being supplied.

A further object of the invention is to provide means for readily regulating the quantity of material to be delivered per total volume of material being treated and other independently operable means for regulating and proportioning the quantity of material to be supplied per unit of the material, such as water or sewage being treated.

A further object is to provide means for automatically indicating the quantity of powder being fed or delivered in proportion to the total volume of material being treated and also in proportion to each unit of such material.

A still further object of the invention is to provide means for presenting the material to the delivering member, such as a table, in a loose uncompact condition.

Other objects and advantages of the invention will be pointed out in the detailed description thereof which follows or will be apparent from such description.

In order that the invention may be readily understood and its many practical advantages fully appreciated, reference may be had to the accompanying drawings forming a part of this specification and in which I have illustrated one form of embodiment thereof. However, it will be understood that changes in the details of construction may be made within the scope of the claims without departing from the invention.

In the drawings: Fig. 1 is a view in front elevation of a machine or apparatus embodying my invention, certain portions of the enclosing casing thereof being removed in order that certain of the mechanism may be shown;

Fig. 2 is a vertical transverse sectional view taken on the line 2—2 of Fig. 1;

Fig. 3 is a view in elevation of a portion of the front part of the machine, certain parts thereof being removed so as to show more clearly certain other parts;

Fig. 4 is a view in end elevation looking toward the left in Fig. 3;

Fig. 5 is a top plan view of certain of the mechanism shown in elevation in Figs. 3 and 4;

Fig. 6 is an enlarged view of a portion of the front part of the machine, certain parts thereof being removed in order that other parts thereof may be more clearly shown;

Fig. 10 is a view in front elevation of a portion of the machine showing a modified construction of means for actuating the delivering table and of the means for regulating the discharge of material by said table;

Fig. 11 is a transverse sectional view taken on the line 11—11 of Fig. 10; and

Fig. 12 is a transverse sectional view taken on the line 12—12 of Fig. 10.

Figure 7:
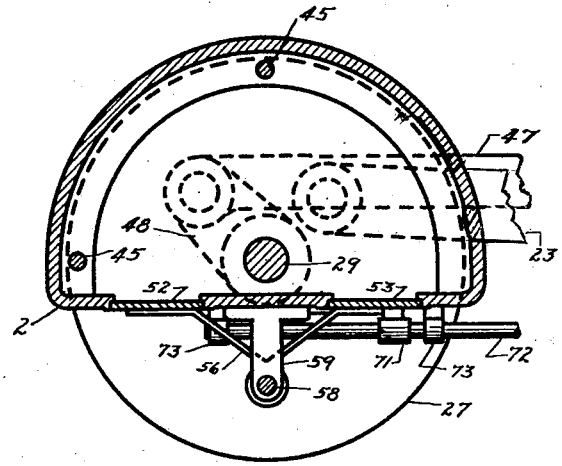
Fig. 7 is a transverse sectional view taken on the line 7—7 of Fig. 6.
Figure 8:
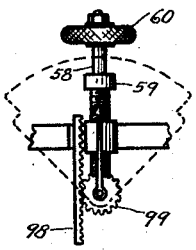
Fig. 8 is a view in elevation showing a pointer and the means for actuating the same separate from other mechanism.

Referring to the drawings: 1 designates the base upon which the casing of the machine and the operating mechanism thereof are supported. One portion of the casing is designated as a whole by the reference numeral 2, while the remaining portion thereof is designated by the reference numeral 3. The upper end of the portion 2 of the casing is circular in transverse section, as indicated at 4, while the lower portion thereof is substantially semi-circular, in cross section, as indicated in Fig. 7.

In the construction, as illustrated, power is supplied for operating the machine or apparatus by means of an electric motor 10, having a shaft 11 which is connected by means of a coupling 12 to a shaft 13 which is provided with a worm 14 which engages with and drives a worm gear 15 secured to an actuating shaft 16 near its center. This shaft is referred to as the actuating shaft because from it the various parts of the mechanism of the machine are, during operation, actuated. The worm 14 and the gear 15 are mounted within the gear casing 17 which casing is supported upon the posts or standards 20 rising from the base 1 of the machine. A crank arm 21 is connected to the upper end of the actuating shaft 16, the outer end of which is provided with a bearing roller situated in a slot 22 within the lever 23. The outer or right hand end of the said lever is provided with a depending projection 24 which is situated in an adjustable trough-shaped cam acting guide 25. The opposite end of the said lever 23 is connected to a projection 26 depending from the lower side of a feed or delivery table 27. The said table extends across the chamber within the casing 2 and is situated about two-thirds of the distance from the top of the said casing. The said table is provided with a hub 28 having an opening therethrough through which the oscillatable shaft 29 extends. The lower end of the hub 28 of the table 27 rests upon a collar 30 secured to the oscillatable shaft 29. The table is loosely mounted upon the said shaft 29 so that it may oscillate or rotate relatively thereto. Upon the rotation of the shaft 16 the engagement of the projection from the crank arm 21 with the sides of the slot 22 causes oscillation of the lever 23. Such oscillation effects oscillating movement of the outer or right hand end of the said lever thereby causing corresponding movement of the projection 24 within the trough-like cam acting member 25. Such movement of the projection 24 within the said cam-like member causes reciprocating movement of the lever 23 to effect back and forth or oscillating movement of the table 27. The material, in powder form and in a dry state, is first delivered to or placed in a hopper 31 the lower portion only of which is shown in the drawings. The said material rests upon the top of a screen 32, preferably of wire, situated within and a short distance below the top of the casing 2 and is supported thereby. The said screen is secured to and supported upon a circular supporting member 33 having a spider or cross members 34 extending transversely thereof. The upper end of the oscillatable shaft 29 is secured to the said cross members 34 at their central point.

The circular supporting member 33 is rabbeted or shouldered upon its outer lower edge and the slightly inclined outwardly extending surface thereof rests upon the truncated cone-shaped rollers 35, the trunnions 36 of which are supported in bearings 37 near the upper end of the casing 2. For the purpose of preventing the screen 32 from clogging I have provided a wiping member 40 which is in the form of a cross and in the lower edges of the arms of which I have secured flexible rubber strips 41. The lower edges of these strips contact with the screen 32 and as the latter is oscillated or rotated there is relative movement between the same and the said rubber wiping strips 41 whereby the powdered material, such as lime, is prevented from clogging the screen openings and is caused to be discharged therethrough. The member 40 is stationarily secured within the upper end portion of the casing 2 a short distance from the top thereof by means of screw bolts 43.

For the purpose of agitating the powdered or granular material within the casing 2 above the table 27 and below the screen 32 to prevent the same from caking or becoming packed, I have provided agitating bars 45 which are supported from the upright oscillatable shaft 29. Only two of these agitating bars are shown but the number may be increased.

Oscillation of the shaft 29 is effected by means of a link 47 connected at one end to the outer end of an arm 48 secured to the lower end of the said shaft 29. The opposite end of the said link is connected to a crank arm 49 projecting from the lower end of the rotatable shaft 16 previously referred to. Rotation of the shaft 16 and the crank 49 attached thereto causes reciprocation of the link 47 which being connected to the shaft arm 48 upon the lower end of the shaft 29 causes oscillation of the latter. The oscillation of the shaft 29, as already indicated, is independent of the oscillation of the table 27. At each oscillation of the table 27 a portion of the powdered material resting thereon within the casing 2 is carried or conveyed through openings 50 and 51 in the front of the said casing. The size of the passageways through these openings through which the material may be delivered by oscillations of the table 27 may be varied by the vertically adjustable doors or gates 52 and 53. These gates are supported respectively upon arms 54 and 55 which depend from the outer ends of a cross-wise extending bar 56 having an enlargement 57 thereon provided with a screw threaded opening in engagement with a rotatable but vertically stationary screw threaded adjusting shaft 58 mounted in bearings 59 upon the front portion of the casing 2. Rotation of the adjusting shaft 58 may be effected by means of the hand wheel 60 upon the upper end thereof. By rotating this shaft in one direction or the other the gates or doors 52 may be raised or lowered as desired. They are guided in their vertical movements by the guides 61 and 62. As will be hereinafter referred to and more fully described, the adjustment of the gates 52 controls the rate of feed of the powdered material with respect to each unit of water or other material to be treated, whereas the extent of the vibrations or oscillations of the table 27, as hereinbefore described, regulates or controls the rate of feed of the said powdered material with respect to each million of such units of the material, such as water, sewage and the like being treated.

Assuming that the table 27 has been oscillated to the left or in an anti-clockwise direction, a certain amount of material would have been conveyed and delivered through the portion of the opening 50 below the lower edge of the gate 52 and in order to prevent the return of the material or a portion thereof back through the said opening into the casing 2 I have provided a scraper 70 which is adapted to be reciprocated back and forth to alternately open and close the openings 50 and 51 and to push or scrape the material from the table 27 as the latter is oscillated.

Assuming that in Fig. 6 the table has just completed an oscillation in an anti-clockwise direction and that a certain amount of material has been conveyed forward through the opening 50 below the lower edge of the gate 52; immediately upon the completion of such movement of the table and prior to the time of the beginning of its movement in the opposite direction the scraper 70 is moved towards the left so as to uncover the opening 51 and close the opening 50 so that as the table moves in the opposite direction or in a clockwise direction the material which has been previously delivered through the opening 50 is scraped from the table while an equivalent amount is delivered through the opening 51 below the lower edge of the gate 53. The scraper 70 then returns to the position as indicated in Fig. 6 so that as the table 27 begins its return anti-clockwise movement the said scraper prevents the return of the material or any portion thereof back into the casing through the opening 51 and causes the same to be discharged from the said table 27.

The scraper 70 is supported upon the angular arm 71 which in turn is supported upon the end portion of a reciprocating bar 72 which is guided in bearings 73 upon the front portion of the casing 2. The opposite end portion of the bar 72 is bent and extended downwardly as indicated at 74 and the lower end of such downwardly bent and extended portions is pivotally connected at 75 to the upper end of an arm 76 which is rigidly connected to a shaft 77 supported in bearings 78. Said shaft is provided with a miter gear 79 which is in engagement with a miter gear 80 upon a shaft 81 supported in bearings 84 upon the base 1. The said shaft 81 is provided with upwardly extending projections 85 and 86 with which a tappet 87 contacts. The said tappet is connected with and depends from the outer end portion of the crank arm 49 previously referred to and is adjustable so as to lengthen or shorten the same so as to vary or adjust the throw of the projections 85 and 86 and thereby vary the extent of the oscillatory movements of the shaft 81 and ultimately of the shaft 77 and of the arm 76 and the parts connected therewith.

The angular relation between the crank arms 49 and 21 is such that the tappet 87 contacts with the projections 85 and 86 to actuate the same alternately in opposite directions so as to effect oscillatory movements of the arm 76 thereby causing reciprocating movement of the scraper 70 at the proper times with respect to the oscillations of the table 27.

Figure 9:
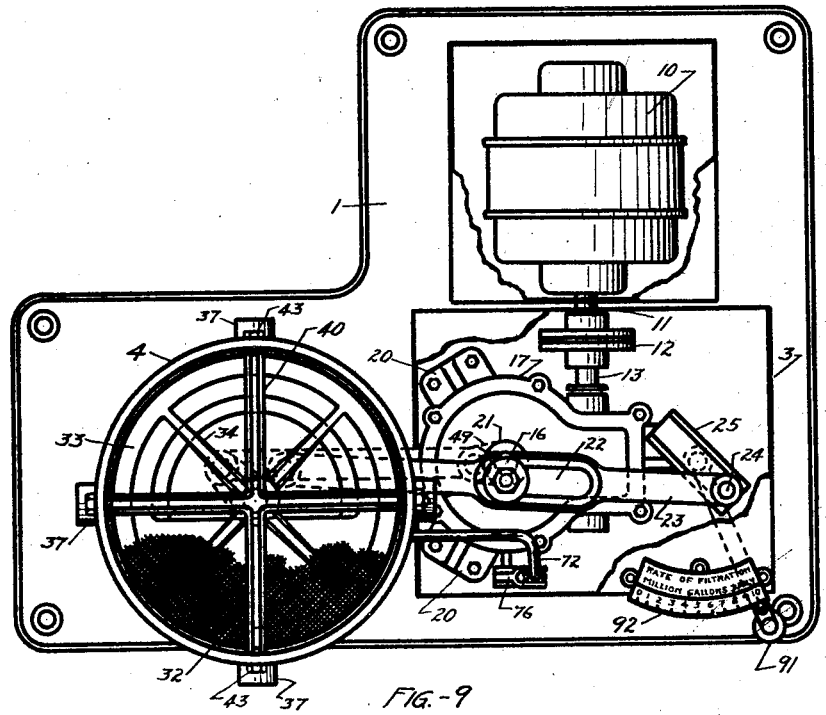
Fig. 9 is a top plan view of the machine or apparatus, certain parts of the top casing thereof being broken away in order that portions of the mechanism may be shown.

The trough-shaped cam-acting member 25 is supported upon the upper end of a post 90 which is adapted to be rotatably adjusted by means of a handle 91. This handle is associated with a scale 92 graduated from zero to ten. In Fig. 9 of the drawing the handle is indicated as being adjusted to the number ten, in which position the lever 23 is caused to reciprocate through the maximum distance of which it is capable in the construction as shown. At the same time the table 27 is oscillated through the maximum arc, feeding or delivering the maximum amount of material which may be delivered through the openings 50 and 51 with the gates or doors 52 and 53 occupying a certain position. If the positions of the doors or gates 52 are varied it follows that with a given amount of oscillatory movement of the table 27 the quantity of material delivered will vary. The quantity of material delivered as a result of the adjustment of the trough-shaped cam-acting member 25 is proportional to the number of units, as for instance, gallons, of material to which the powder is to be delivered. The machine is particularly designed for the treatment of water in filtration plants and consequently the adjustment of the said trough-shaped cam-acting member is with respect to the water to be treated in terms of millions of gallons.

The adjustment of the doors or gates 52 has relation to and is adapted to proportion the quantity of powdered material delivered to each unit of the material, such as water, being treated. By lowering the said doors or gates the quantity delivered per unit of water to be treated is decreased while by elevating the same the quantity per unit is increased.

For the purpose of facilitating the adjustment of the doors 52 and 53 so as to deliver the quantity of material desired to supply the portion required per unit of material, such as water, being treated, I have provided a scale 95 graduated from zero to five. A pointer 96 co-operates with the said scale and as adjusted in Fig. 1 of the drawings indicates that the doors 52 and 53 are adjusted so as to permit the delivery of a sufficient quantity of material to provide more than two and less than two and a half units of powder per unit of material being treated, whatever these units may be. The unit of material being treated may be the gallon, while the unit of powdered material to be added thereto may be the grain or any other unit indicating a relatively small quantity.

For the purpose of automatically actuating the pointer 96 upon the adjustment of the doors 52 and 53 I have provided a rack 98 which is secured upon the bar 56 which engages a pinion 99 upon the short shaft 100 upon the outer end of which the pointer or indicator 96 is fastened.

The material which is discharged from the table 27 as hereinbefore described falls into a hopper 101 and is delivered therefrom through a short pipe 102 to an eduction pipe 103 by which it is conveyed to the water, sewage or the like which is being treated. For the purpose of causing and facilitating the discharge of the material from the hopper 101 I provide means for supplying water thereto which comprises a pipe 104 leading from the pipe 105, the said pipe 104 being connected at its upper end to the upper part of the hopper 101 and discharging into a channel 106 at the upper edge of the said hopper. The pipe 105 supplies water to the eduction pipe 103. A valve at 108 controls the supply of water through the pipe 105 to the eduction pipe 103.

The mechanism for actuating the pointer 96, the exposed portion of the table 27 at the front of the apparatus and the top of the hopper 101 are shielded and protected by a cover 109.

As already stated, the apparatus embodying my invention comprises two separate and independent means for regulating and controlling the quantity of material delivered from the table 27. One of these means is adapted to regulate the quantity of material desired or required per single unit of water, sewage, or the like being treated, while the other regulates and controls the quantity of material to be delivered for larger amounts of water, sewage or the like being treated which may be measured in millions of gallons. The said devices are adapted to and may be caused to co-operate to feed the material from the casing 2 in properly regulated and proportioned quantities.

In Figs. 10 to 12, inclusive, I have shown a modified construction of feeding means in which the table 27 is not oscillated but is rotated step by step in a single direction. In this construction the lever 23 is provided at its inner end with a couple of pivoted arms 110 and 111. The arm 110 is connected at its outer swinging end to an arm 112 while the arm 111 is connected to a similar arm 113 both of which are mounted to oscillate upon the table supporting shaft 29. The outer ends of these arms 112 and 113 are provided with pawls 114 and 115 pressed inwardly by springs 116. Each of said pawls points in the same direction and is in engagement with the ratchet teeth upon a ratchet wheel 117 which is rigidly secured to the hub 28 of the table 27. The arms 112 and 113 are arranged in angular relation with respect to each other. As also appears, the arms 110 and 111 are situated upon opposite sides of the shaft 29. It will be apparent that upon an inward movement of the reciprocating lever 23 the arm 110 will cause movement of the arm 112 to the right (having reference to Fig. 11) while the arm 113 will be moved to the left. The pawl 115 being in engagement with a tooth upon the ratchet wheel 117 will cause movement thereof. Upon reverse or outward movement of the lever 23 the arm 113 will be moved toward the right (having reference to Fig. 11) while the arm 112 will be moved to the left causing further movement of the ratchet wheel 117 in the same direction. The table 27 will be moved in like direction so that the material supported thereon within the casing 2 will be delivered through the single opening 120 controlled by the gate 121 which is adapted to be adjusted by means of the adjusting rod 122 supported in a vertically stationary position in a bearing 123 upon the casing 2. The material which is removed from the casing by the table 27 is scraped from the said table by the front portion of the casing 2 at the right hand side of the opening 120, having reference to Fig. 10 of the drawing.

Having thus described my invention, what I claim and desire to secure by Letters Patent is:

1. In a dry-feed machine, the combination of angularly adjustable means for controlling the quantity of substance to be fed in proportion to the total volume of material being treated, with means for controlling the quantity of said substance to be fed in proportion to each unit of the said material being treated, said first named proportion being varied without stopping the machine by varying the angle of adjustment of the said angularly adjustable means.

2. In a dry-feed machine, the combination of means for controlling the quantity of substance to be fed in proportion to each unit of material to be treated and independently controllable means adapted to be angularly adjusted for controlling the quantity of said substance in proportion to a relatively large volume of the material to be treated including a predetermined number of said units, the said last named proportion being varied without stopping the machine by varying the angle of adjustment of the said angularly adjustable controlling means.

3. In a dry-feed machine, the combination of controllable means for regulating the quantity of substance in powdered form to be fed in proportion to each unit of water or sewage to be treated, and independent controllable means adapted to be angularly adjusted for controlling the quantity of said substance in proportion to relatively large volumes of the said water or sewage including a relatively large predetermined number of said units, the said last named proportion being varied without stopping the machine by varying the angle of adjustment of the said angularly adjustable controlling means.

4. In a dry-feed machine, the combination of a feed table, means for supplying to said table in powdered form the substance to be fed therefrom, means for actuating the said table to feed the said substance therefrom, and two separate and independently acting means for regulating and controlling the rate of feed of said material from said table, one of said means being angularly adjustable to vary the feeding of said material in proportion to the total quantity of material being treated without interrupting the operation of the machine.

5. In a dry-feed machine, the combination of a feed table, means for supplying to said table in powdered form the substance to be fed therefrom, means for causing oscillatory movements of said table to feed the said material therefrom, angularly adjustable means for varying the extent of the movements of said table to vary the quantity of substance delivered therefrom in proportion to the total quantity of material being treated which means may be adjusted without stopping the machine, and independent controllable means for regulating and controlling the rate of feed of said substance from said table in proportion to each unit quantity of material being treated.

6. In a dry-feed machine, the combination of a feed table, means for oscillating said table, means for supplying a substance in powdered form to said table, and means for causing a quantity of material to be discharged from said table at each oscillation.

7. In a dry-feed machine, the combination of a feed table, a casing across which said table extends, the said casing having an opening through which a portion thereof projects and also having a couple of spaced openings extending upwardly from said table, means for supplying a substance in powdered form to said table, means for oscillating said table to carry portions of said substance alternately through said spaced openings, means for alternately opening and closing said openings to permit the feed of portions of said substance through one of the same and at the same time prevent the return of other portions through the other of said openings.

8. In a dry-feed machine, the combination of a feed-table, a casing across which said table extends, the said casing having an opening through which a portion of said table projects and also having a couple of spaced openings extending upwardly from said table, means for supplying a substance in powdered form to the chamber of said casing above said table, the said substance within the casing being supported upon said table, means for oscillating said table to carry portions of the said substance alternately through the said spaced openings, and oscillating means for alternately opening and closing the said openings for the purpose described.

9. In a dry-feed machine, the combination of a feed table, means for supplying a substance in powdered form to said table, means for oscillating said table, and means for varying the distance through which said table is adapted to be oscillated.

10. In a dry-feed machine, the combination of a feed table, means for supplying a substance in powdered form to said table to be fed therefrom, means for oscillating said table, and means comprising an adjustable guiding cam acting device for varying the distance through which said table is adapted to be oscillated.

11. In a dry-feed machine, the combination of a feed table, a casing having a chamber across which the said table extends, a portion of said table projecting through an opening in a wall of said casing, the said wall having a couple of spaced openings extending upwardly from the said table, means for alternately opening and closing the said openings, an actuating member, and independent means actuated by said member for oscillating the said table and for reciprocating the said means for alternately opening and closing the said openings, substantially as described.

12. In a dry-feed machine, the combination of a feed table, a casing having a chamber across which the said table extends, the said casing having an opening in a wall thereof through which a portion of said table projects, and said casing also having a couple of spaced openings extending upwardly from the said table, a revoluble shaft, means actuated by said shaft for causing oscillations of said table, means for alternately closing the said spaced openings, and means intermediate the said last mentioned means and the said shaft for causing reciprocating movements of said closing means.

13. In a dry-feed machine, the combination of a table, a casing having a chamber across which the said table extends, said casing having openings spaced apart through which a substance in powdered form is adapted to be fed from said chamber, means for supplying the said substance to said chamber, agitating means within said chamber above said table, a revoluble shaft, means actuated by said shaft for causing oscillating movements of said table, and means intermediate said shaft and the said agitating means for actuating the latter.

14. In a dry-feed machine, the combination of a table, a casing having a chamber across which the said table extends, said casing having an opening through which a portion of said table projects and also having a couple of spaced openings extending upwardly from said table, a lever having connection at one end with said table a distance from its axis, an adjustable guiding and cam acting device in engagement with the opposite end of said lever, and means for causing oscillating movements of said lever to thereby cause oscillating movements of the last mentioned end thereof whereby reciprocating movements of said lever are effected to cause oscillating movements of said table.

15. In a dry-feed machine, the combination of a feed table, a casing having a chamber across which the said table extends, means for supplying a substance in powdered form to said chamber, which substance is supported upon said table, a vertical shaft within said casing upon which said table is rotatably mounted, agitating means supported upon said shaft above said table within the said chamber, a revoluble shaft, and separate and independent means intermediate said revoluble shaft and the said table and the said first mentioned shaft for effecting independent oscillating movements thereof.

16. In a dry-feed machine, the combination of a feed table, a casing having a chamber across which the said table extends, a portion of said table projecting through an opening in a wall of said casing, one or more discharge openings through said wall extending upwardly from said table, a screen extending across the said chamber near the upper end of said casing, the said screen being adapted to support the substance to be supplied to said chamber, an agitator within said chamber intermediate the said screen and the said table, the said agitator and the said screen being connected together, means for oscillating said agitator, and means for oscillating the said table.

17. In a dry-feed machine, the combination of an oscillatable feed table, a lever having pivotal connection at one end with said table a distance from its axis, a guiding cam acting member in engagement with the outer end of said lever, means for angularly adjusting the said member, and a revoluble shaft having means in engagement with said lever at a point intermediate its ends to effect oscillation thereof to thereby effect reciprocating movements thereof and cause oscillating movements of said table.

18. In a dry-feed machine, the combination of a feed table, a casing having a chamber across which the said table extends, means for causing oscillating movements of said table, a screen situated in the chamber of said casing a distance above said table and below the upper end of said casing, means for supplying a substance to said casing, means for oscillating said screen, and stationary wiping means contacting with the upper side of said screen to prevent the said substance from lodging within the openings of said screen to clog the same.

19. In a dry-feed machine, the combination of a feed table, a casing having a chamber across which said table extends, means for oscillating said table, a shaft extending upwardly through said chamber within said casing, means for oscillating said shaft, a screen supported upon said shaft, means for supplying a substance to the upper part of said chamber above said screen, said substance being supported upon said screen, an agitator also supported upon said shaft and situated below said screen and above the said table, and wiping devices situated within said chamber and contacting with the upper side of the said screen to prevent clogging of the openings therethrough.

20. In a dry-feed machine, the combination of a feed table, a casing having a chamber across which said table extends, a portion of said table projecting through an opening in a wall of said casing, the said wall being provided with a plurality of spaced openings extending upwardly from the said table, a revoluble actuating shaft, means actuated by said shaft for causing oscillating movements of said table, means for varying the extent of said oscillating movements, means for varying the size of the said spaced openings, means for alternately opening and closing the said openings, an arm having connection with said means, and means intermediate the said arm and the said actuating shaft whereby revolution of the latter causes oscillating movements of the said arm to effect reciprocating movements of the said closing means, substantially as described.

In testimony that I claim the foregoing as my invention, I have hereunto signed my name this 16th day of February, A. D. 1922.

GEORGE H. DIDINGER.